G. J. MILLER.
TYING MECHANISM FOR HAY PRESSES.
APPLICATION FILED MAY 18, 1914.

1,118,947.

Patented Dec. 1, 1914.
4 SHEETS—SHEET 1.

Witnesses
Wynne Johnson

Inventor
G. J. Miller,
By
C. L. Parker,
Attorneys

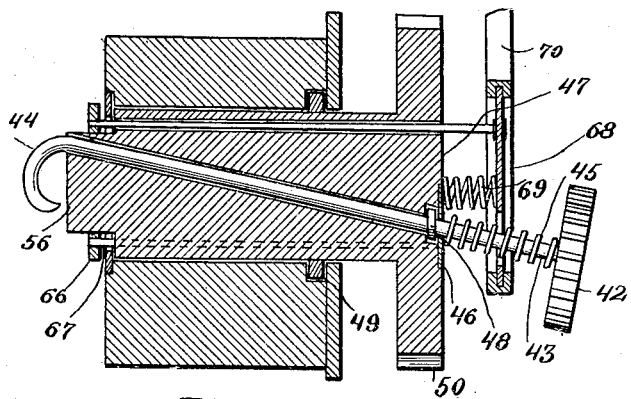
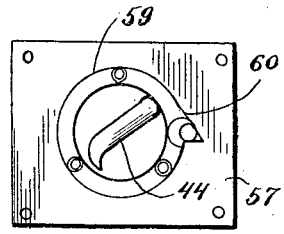
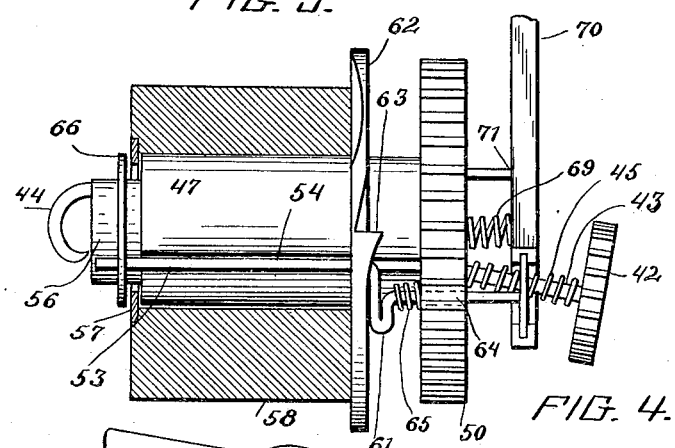
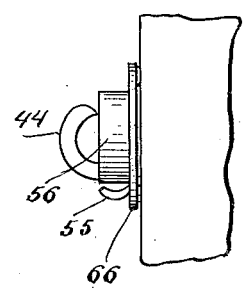
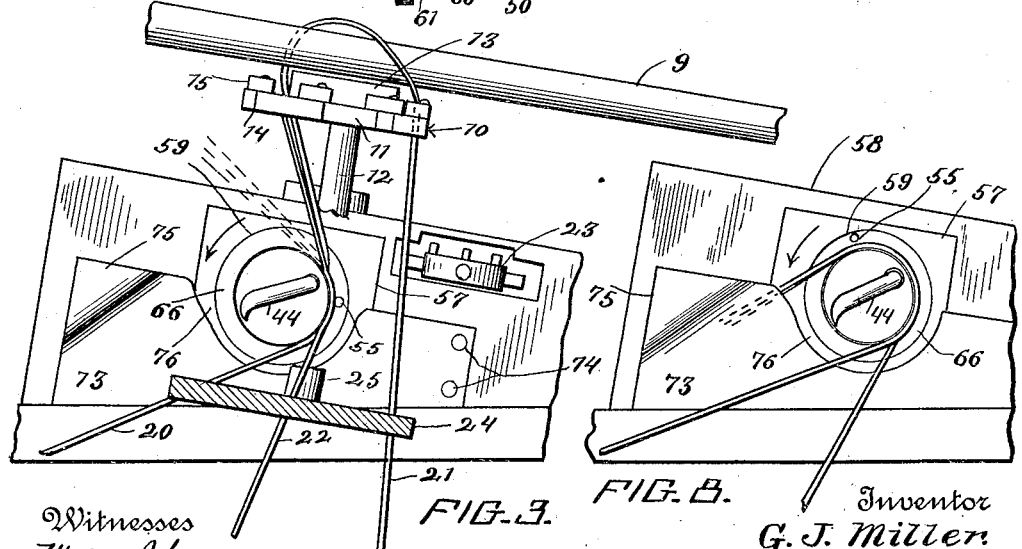

G. J. MILLER.
TYING MECHANISM FOR HAY PRESSES.
APPLICATION FILED MAY 18, 1914.

1,118,947.

Patented Dec. 1, 1914.
4 SHEETS—SHEET 3.

Witnesses

Inventor
G. J. Miller.
By
Attorneys

UNITED STATES PATENT OFFICE.

GEORGE J. MILLER, OF WILLOW HILL, ILLINOIS, ASSIGNOR OF ONE-HALF TO LEWIS W. MILLER, OF NEWTON, ILLINOIS.

TYING MECHANISM FOR HAY-PRESSES.

1,118,947.  Specification of Letters Patent.  Patented Dec. 1, 1914.

Original application filed December 5, 1913, Serial No. 804,880. Divided and this application filed May 18, 1914. Serial No. 839,309.

*To all whom it may concern:*

Be it known that I, GEORGE J. MILLER, a citizen of the United States, residing at Willow Hill, in the county of Jasper and State of Illinois, have invented certain new and useful Improvements in Tying Mechanism for Hay-Presses, of which the following is a specification.

The present invention relates to tying mechanism, for use in connection with hay presses or the like.

An important object of the invention is to provide means of the above mentioned character, which are adapted to tie the ends of a strand of wire or other element passed about a bale of hay or the like, and which is automatic and reliable in operation.

The subject matter of this invention is disclosed in my co-pending application for hay press, Serial No. 804,880, filed December 5, 1913, of which the present application is a division but not claimed *per se* therein.

Figure 1:
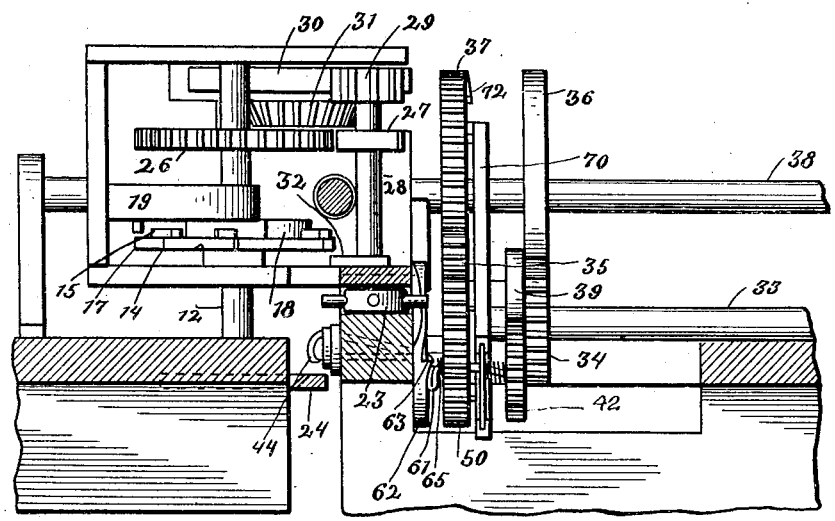
Figure 2:
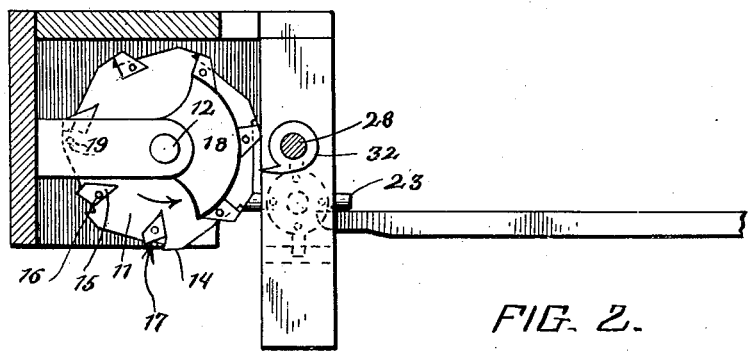
Figure 9:
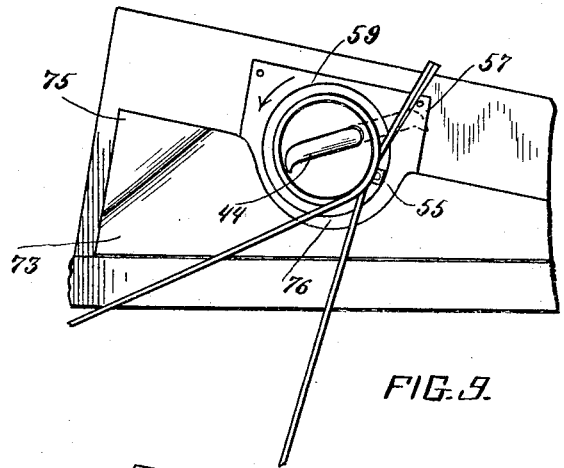
Figure 10:
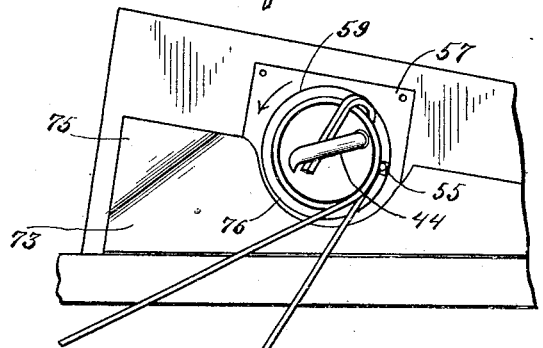
Figure 11:
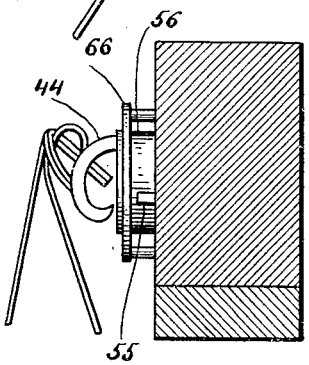
Figure 12:
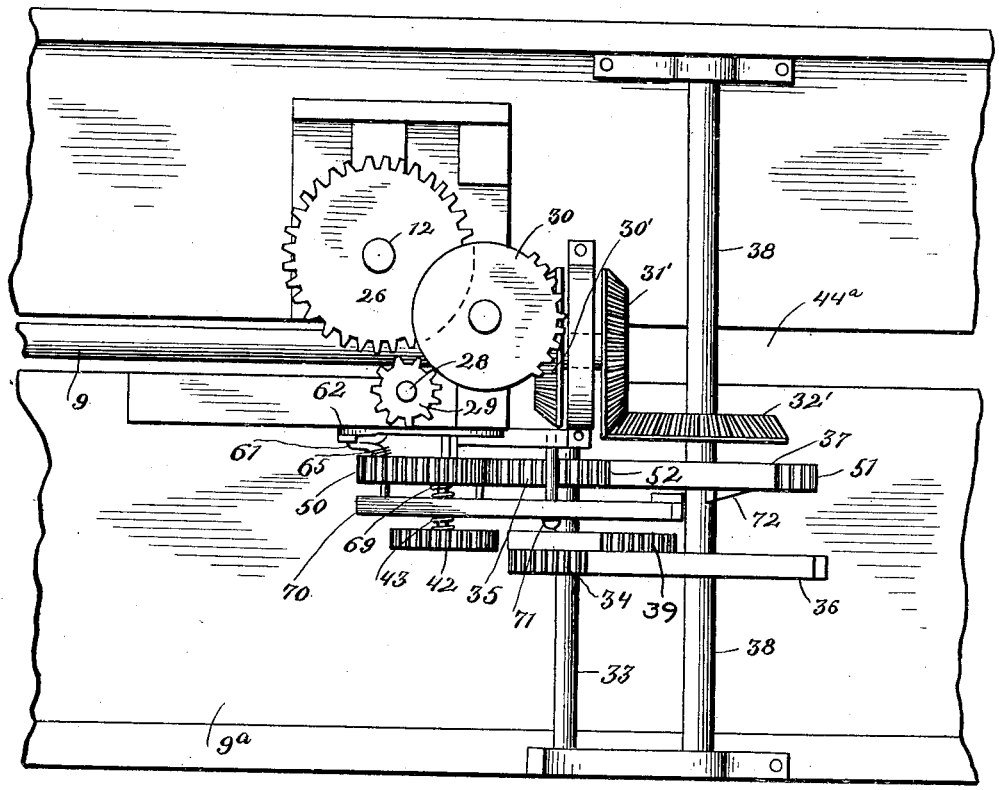
Figures 13, 14:
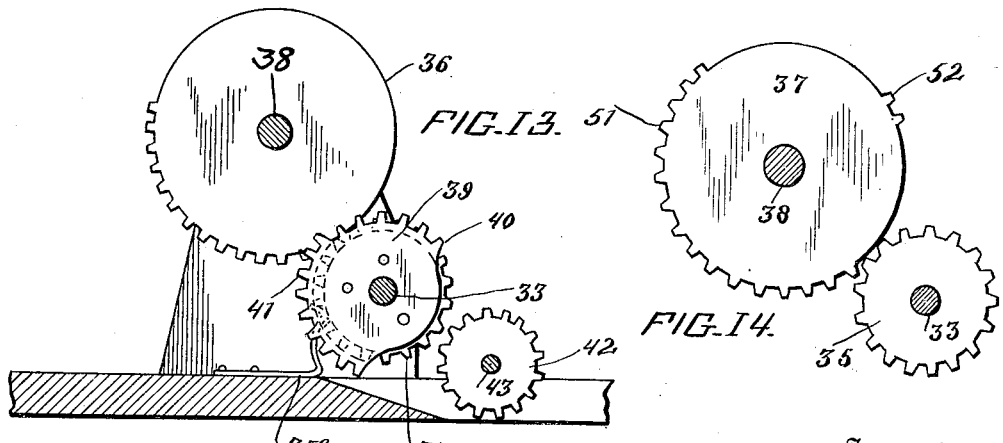

In the accompanying drawings forming a part of this specification and in which like numerals are employed to designate like parts throughout the same, Figure 1 is a side elevation of apparatus embodying my invention, Fig. 2 is a plan view of the clamping mechanism, associated elements being shown in section and plan, Fig. 3 is an end elevation of tying mechanism and associated elements, Fig. 4 is a side elevation of the tying mechanism, parts being shown in section, Fig. 5 is central longitudinal sectional view through the tying mechanism, Fig. 6 is an end elevation of the tying mechanism, parts being omitted, Fig 7 is a side elevation thereof, Fig. 8 is an end elevation of the tying mechanism showing the elements thereof in different position, Fig. 9 is a similar view showing the elements in a different position, Fig. 10 is a similar view with the elements occupying a different position, Fig. 11 is a side elevation of the tying mechanism with the tied ends of the wire being removed from the tying mechanism, Fig. 12 is a plan view of the apparatus shown in Fig. 1, Fig. 13 is a side elevation of a plurality of gears, and, Fig. 14 is a similar view.

As more clearly shown in Figs. 3 and 12, the numeral 9 designates a looper rod, which extends longitudinally of the baling chamber 9ª and has the wire which is passed about the bale placed over the same, to slide longitudinally thereon.

Attention being called more particularly to Figs. 1, 2, and 3, the numeral 10 designates a detachable clamping or holding element, as a whole, such element or means comprising a rotatable disk 11 which is rigidly mounted upon a vertical rotatable shaft 12, journaled through a bearing 13. The disk 11 is provided at its periphery with stationary teeth 14 and pivoted co-acting teeth 15, connected with said disk, as shown at 16. As each tooth 15 moves in the direction of the arrow, in Fig. 2, the same is primarily opened, providing a space 17, for the reception of a portion of the wire, as will be explained. Each tooth 15 is moved into slidable engagement with a stationary cam-track 18 whereby the tooth is swung outwardly and the wire within the recess or space 17 is securely clamped between the co-acting teeth 14 and 15, and remains thus clamped until the pivoted tooth clears the opposite end of the stationary cam-track 18. Each pivoted tooth 15 is successively swung to its inner position by a stationary stop or striker element 19. The operation of the clamping means or element will be more clearly understood by referring to Fig. 3. The portion 20 of the wire is now being held by the clamping means including the disk 11, which is now stationary. The portion 21 of the wire is moved within one of the recesses 17, to be clamped to the plate or disk 11 upon its turning movement, and the portion 22 of the wire moved into engagement with a star-wheel 23 to advance it a step, said portion 22 being moved into engagement with the portion 20, to be cut and tied therewith, as will be explained. As the portion 21 of the wire clamped by the holding means before the portion 20 of the wire is cut, moves toward the plate or disk 11, it engages a retarding tooth wheel 24, which is rigidly mounted upon a vertical shaft 25, such portion 21 of the wire being held thereby in spaced relation to the star-wheel and the tying means to be described. The function of this star-wheel is to throw the tying mechanism into action, by engagement therewith by the wire. As this means is not to be claimed in the present application no further description thereof is thought necessary.

As more clearly shown in Fig. 1, the vertical shaft 12 is turned by a pinion 26, rigidly mounted thereon. The pinion 26 is engaged and driven by a stripped pinion 27, of much smaller diameter. The pinions 26 and 27 are to be so constructed that upon a complete revolution of the pinion 27 the pinion 26 will be advanced a step whereby the portion of wire 21 which has just moved into the recess 17 will be clamped, said pinions 26 and 27 then disengaging, subsequent to which the pinion 27 temporarily stops, said pinion 27 being again started to complete its revolution, the same effecting a further turning movement of the pinion 26, whereby said portion of the wire will be advanced to occupy a position in proximity to cutting means to be described, whereby it will be cut by said cutting means the next time it is operated. The stripped pinion 27 is rigidly mounted upon a vertical rotatable shaft 28, having a small pinion 29 rigidly connected therewith. The small pinion 29 is driven by a stripped pinion 30. The pinions 29 and 30 are so constructed that upon a complete revolution of the pinion 30 the pinion 29 will be rotated a complete revolution, the pinion 30 first turning the pinion 29 for about one-half a revolution, stopping the same, and then turning the pinion 29 for the other half of the revolution. The pinion 30 has a bevel gear 31 arranged therebelow and rigidly connected therewith, such bevel gear being driven by a bevel gear 30' of the same diameter (see Fig. 12). The bevel gear 30' is rigidly mounted upon the looper rod 9. This looper rod is rotated by the bevel gear 31', rigidly mounted thereon, and being of the same diameter as the bevel gear 30'. The bevel gear 31' is driven by a bevel gear 32', of the same diameter, rigidly mounted upon a transverse shaft 38. This shaft is turned by the means shown in my said co-pending application.

As shown in Figs. 1 and 2, a rotatable cutter 32 is rigidly connected with the lower end of the vertical shaft 28, the same occupying a normal starting position, as shown in Fig. 2. As above stated, the shaft 28 is first rotated one-half of a revolution, stopped, then rotated for the other half of a revolution. Upon the turning of the shaft 28 upon the first half of the revolution the cutter 32 will cut portions 20 and 22 of the wire, the same being subsequently tied together, as will be explained. Upon the turning of the shaft 28 for the second half of its complete revolution, the cutter 32 will be rotated or returned to its normal starting position.

The numeral 33 designates a relatively stationary horizontal transverse shaft, upon which are rotatably mounted independently of each other gears 34 and 35, which are driven respectively by stripped gears 36 and 37. Each gear or pinion 34 and 35 is engaged by a stationary leaf-spring 35ª, serving to prevent improper rotation thereof. The stripped gear 36 is adapted to rotate the gear 34 for a complete revolution while it is making one-half of a revolution, the gear 34 remaining stationary while the stripped gear 36 is making one-half of a revolution. The gear 36 is rigidly mounted upon shaft 38.

The numeral 39 designates a stripped stepped pinion, provided with inner and outer sets of teeth 40 and 41, which are concentric with relation to each other. The pinion 39 is rotatably mounted upon shaft 33 and is rigidly connected with the pinion 34. The pinion 39 is adapted to operate a planetary pinion 42 in a manner to be more fully described. The planetary pinion 42 is more clearly shown in Figs. 4 and 5, the same being rigidly connected with the outer end of a rotatable tying rod 43, having its opposite free end bent into the form of a hook 44, which is slightly spirally twisted. The hook 44 is disposed below and in alinement with a slot 44ª. As more clearly shown in Fig. 5, the tying rod 43 is provided at its outer end with a compressible coil spring 45 engaging an apertured plate 46, carried by a rotatable sleeve 47. The function of this spring is to prevent the tying rod 43 from being improperly rotated. Disposed within the recess arranged beneath the plate 46 is a collar 48, serving to positively prevent the tying rod 43 from moving longitudinally toward its hooked end.

The numeral 49 designates a ring, rigidly connected with the sleeve 47, and serving to prevent its longitudinal movement in both directions. As more clearly shown in Fig. 5, the tying rod 43 extends diagonally through the rotatable sleeve 47.

As more clearly shown in Figs. 4 and 5, the sleeve 47 is provided at its outer end, with a pinion 50 rigidly connected therewith and engaged by the pinion 35. The pinion 35 is driven by the pinion 37, as more clearly shown in Fig. 14. The pinion 37 is provided with two sets of gear teeth 51 and 52. In operation, upon the complete revolution of the gear 37, the set of teeth 51 first engage the teeth of the pinion 35, to rotate the pinion 35 for almost a complete revolution, said pinion 35 being stopped by the disengagement of the teeth 51 therefrom and again turned to complete the revolution when the teeth 52 engage therewith.

As more clearly shown in Fig. 4, the sleeve 47 is provided upon its periphery with a longitudinally extending groove 53, within which is mounted to reciprocate a clamping rod 54, the inner end of which is slightly inwardly curved or hooked, as shown at 55 in Fig. 7. The slightly hooked end 55 of the clamping rod 54 is adapted to move outwardly to over-hang the reduced end or spool 56 of the sleeve 47.

As more clearly shown in Fig. 6, the numeral 57 designates a stationary plate, attached to a fixed support 58, through which the sleeve 47 is journaled. This plate is provided with a circular opening 59, sufficiently large to receive the reduced end or spool 56 and the outer end 55 of the clamping rod 54, the wall of the opening 59 serving to bend the outer or hooked end 55 inwardly to clamp the portions of the wire to the reduced end of spool 56, said hooked end 55 automatically springing or moving away from the reduced end or spool 56 when the same is moved into a recess 60, formed in the plate 57.

As more clearly shown in Fig. 4, the clamping rod 54 is bent near its outer end to provide a crank 61, to travel in engagement with a stationary cam-plate 62, provided with a cam-shoulder 63. Outwardly of the crank 61 the outer end of the clamping rod 54 extends into the opening 64 formed in the pinion 50, such outer end being off-set outwardly with relation to the body portion of the clamping rod 54, whereby said rod cannot turn upon its longitudinal axis with relation to the sleeve 47. The clamping rod 54 is forced longitudinally in one direction, when released, by a suitably stiff compressible coil spring 65. As each bale is being completed, the portions 20 and 22 of the wire are moved into engagement with the reduced end or spool 56, inwardly of and adjacent the outer hooked end 55 of the clamping rod 54, such clamping rod being now held to the right whereby the end 55 thereof will not be disposed in the path of travel of the portions 20 and 22 of the wire, as the same is moved into engagement with said reduced end or spool. The clamping rod 54 is held to the right against the action of the spring 65 by the crank 61 engaging the shoulder 63. The hooked end 55 is also arranged within the recess 60. It is thus seen that when the sleeve 47 commences to turn, the crank 61 will be tripped by the cam-shoulder 63, while the hooked end 55 remains within the recess 60. The spring 65 will now automatically move the clamping rod 54 toward the portions of wire 20 and 22, whereby they will be contained within the hooked end 55, such hooked end being slightly spaced from the reduced end or spool 56, whereby said hooked end 55 can pass over the portions of wire 20 and 22 without pushing them off of the reduced end or spool. Upon the further turning movement of the sleeve 47, the outer hooked end 55 will be moved out of the recess 60 and slidably engage the wall of the circular opening 59, whereby said hooked end 55 is forced or bent inwardly for clamping the portions 20 and 22 to the reduced end or spool 56 holding them upon the same until said hooked end 55 again enters the recess 60.

Mounted to reciprocate upon the reduced end or spool 56 (see Figs. 3, 4, 5 and 7), adjacent the hook 44 is a removing ring 66, attached to the ends of reciprocatory rods 67 to be moved therewith. Rigidly connected with the opposite ends of these rods is a shifting disk 68 forced outwardly by spring or springs 69. The shifting disk is rotatably mounted within the forked end of a shifting lever 70, pivoted between its ends as shown at 71. The shifting lever 70 is swung in one direction by a trip cam 72, carried by the gear or pinion 37. The gear or pinion 37 thus automatically moves the shifting lever 70, to move the ring 66 longitudinally of the reduced end or spool 56, whereby the tied portions 20 and 22 of the wire are removed therefrom, as will be more fully explained in connection with the explanation of the operation of the tying mechanism.

The numeral 73 (see Figs. 3 and 8), designates a guide plate, one end of which is connected with a stationary support, as shown at 74, while the opposite end is free from connection and is bent outwardly slightly, as shown at 75. There is a curved space 76 between the removing ring 66 and the plate 75, whereby the cut ends of the wire may be carried by the clamping hook 55 behind the guide plate 73.

The operation of the apparatus is as follows: In the tying operation the portion 21 of the wire is moved into one of the recesses 17, while the portion 22 is moved into engagement with the star-wheel 23 to advance the same a step, subsequently to which the portion 22 of the wire engages with the portion 20 of the wire, the two being arranged upon the reduced end or spool 56 of the sleeve 47, as more clearly shown in Figs. 3 and 8 to 10 inclusive. Upon the movement of the star-wheel, as above stated, the elements of the cutting and tying means are thrown into action. The clamping hook 55 will first move outwardly to hold the portions 20 and 22 of the wire upon the extension or spool 56, the sleeve 47 being now rotated. The cutter 32 is also being rotated whereby it will cut the upper end of the portions 20 and 22 of the wire, such cut ends remaining upon the extension or spool 56 and being carried behind the guide plate 73, as best illustrated in Fig. 8, the sleeve 47 continuing to rotate until said cut ends pass above the guide plate upon the opposite side of the reduced extension or spool 56, as clearly illustrated in Fig. 9. The cut ends of the portions 20 and 22 are now upon the inner side of the portions 20 and 22. The sleeve 47 now temporarily stops and the tying rod 43 begins to rotate, as shown in Fig. 9, whereby its hooked end 44 will engage the cut end of portions 20 and 22 of the wire, carrying them outwardly across themselves, and holding them upon the end of the extension or spool 56, as illustrated in Fig. 10. The sleeve 47 again starts to rotate, after the hooked end 44 engages and holds the cut portions 20 and 22, the sleeve and hook 44 now turning together until the sleeve 47 returns to its normal starting position, at which time the hooked end 55 of the clamping rod 54 will return into the recess 60, to release the tied portions 20 and 22 of the wire. When the sleeve 47 stops for the second time, the removing ring 66 is moved outwardly upon the reduced extension or spool 56, as shown in Fig. 11, whereby the tied portions 20 and 22 of the wire are sufficiently started or loosened so that the pull upon the wire from the bale will completely remove such portions from the reduced extension or spool 56, in their tied position. The tied ends of the wire having been removed from the extension or spool, the clamping element 11 has sufficiently turned or rotated to bring the portion 21 of the wire into engagement with the extension or spool 56, the same occupying the position of the portion 22, whereby the operation may be carried out repeatedly.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having described my invention, I claim:—

1. In apparatus of the character described, the combination with a rotatable element upon which members to be tied are wound, of a clamping rod extending longitudinally of the rotatable element for rotation therewith and adapted to be moved longitudinally of the same, automatic means to effect the longitudinal movement of the clamping rod when the rotatable element is moved to a certain position, a hook carried by the rotatable element and arranged near the clamping rod to engage the members to be tied and adapted to be rotated with relation to the rotatable element, and means to rotate the hook upon its axis with relation to the rotatable element.

2. In apparatus of the character described, the combination with a rotatable element upon which members to be tied are wound, of a clamping rod extending longitudinally of the rotatable element for rotation therewith and adapted to be moved longitudinally of the same, automatic means to effect the longitudinal movement of the clamping rod when the rotatable element is moved to a certain position, a hook carried by the rotatable element and arranged near the clamping rod to engage the members to be tied and adapted to be rotated with relation to the rotatable element, means to rotate the hook upon its axis with relation to the rotatable element, and means to rotate the rotatable element.

3. In tying mechanism, the combination with a rotatable element upon which members to be tied are wound, of clamping means for the members carried by the rotatable element, a guide plate arranged near the rotatable element, a rotatable rod extending diagonally through the rotatable element and provided at one end with a hook arranged adjacent the end of the rotatable element, and a loop removing ring mounted upon the rotatable element adjacent the hook.

4. In tying mechanism, the combination with a rotatable element upon which members to be tied are wound, of clamping means for the members carried by the rotatable element, a guide plate arranged near the rotatable element, a rotatable rod extending diagonally through the rotatable element and provided at one end with a hook arranged adjacent the end of the rotatable element, means to rotate the rotatable element, and means to rotate the rod independently of the rotatable element.

5. In apparatus of the character described, the combination with a rotatable element upon which members to be tied are wound, of a rotatable rod extending diagonally through the rotatable element with one end thereof bent to form a hook arranged adjacent the corresponding end of the rotatable element.

6. In tying mechanism, the combination with a rotatable spool to receive elements to be tied, of means to hold the elements upon the spool, an eccentrically arranged hook carried by the spool to engage with the elements to be tied, means to rotate the hook with relation to the spool, and means to push the elements to be tied off of the spool.

7. In apparatus of the character described, the combination with a rotatable element upon which members to be tied are wound, of a clamping rod extending longitudinally of the rotatable element for rotation therewith and adapted to be moved longitudinally of the same, automatic means to effect the longitudinal movement of the clamping rod when the rotatable element is moved to a certain position, a hook carried by the rotatable element and arranged near the clamping rod to engage the members to be tied and adapted to be rotated with relation to the rotatable element, means to rotate the hook upon its axis with relation to the rotatable element, means to rotate the rotatable element, a removing element mounted upon the rotatable element to be moved longitudinally thereof to push the tied members off of the rotatable element, and automatic means to move the removing element longitudinally of the rotatable element.

8. In tying mechanism, an approximately horizontal guide rod to receive elements to be tied, an approximately horizontally rotatable spool arranged below and transversely of the guide rod, whereby the elements to be tied are moved into engagement with the spool by sliding longitudinally upon the guide rod, means to temporarily hold the elements upon the spool, means to cut the elements at a point spaced a substantial distance from the spool, means to bodily rotate the spool, a member rotatable with relation to the spool and adapted to engage the cut ends of the elements during the tying operation thereof, and means to move the elements off of the spool.

In testimony whereof I affix my signature in presence of two witnesses:

GEORGE J. MILLER.

Witnesses:
L. C. STEUART,
S. P. BENIS.

Copies of this patent may be obtained for five cents each, by addressing the "Commissioner of Patents, Washington, D. C."